United States Patent
Yishay

(10) Patent No.: US 9,589,073 B2
(45) Date of Patent: Mar. 7, 2017

(54) SYSTEMS AND METHODS FOR KEYWORD SPOTTING USING ADAPTIVE MANAGEMENT OF MULTIPLE PATTERN MATCHING ALGORITHMS

(71) Applicant: Verint Systems Ltd., Herzelia, Pituach (IL)

(72) Inventor: Yitshak Yishay, Revava (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 219 days.

(21) Appl. No.: 14/263,108

(22) Filed: Apr. 28, 2014

(65) Prior Publication Data

US 2015/0310014 A1     Oct. 29, 2015

(30) Foreign Application Priority Data

Apr. 28, 2013    (IL) .......................................... 226056

(51) Int. Cl.
     *G06F 17/30*          (2006.01)
(52) U.S. Cl.
     CPC .............................. *G06F 17/30985* (2013.01)
(58) Field of Classification Search
     CPC ........ G06F 17/30864; G06F 17/30867; G06Q 30/02
     USPC ....... 707/728, 758, 798, 710, 771, 748, 713; 706/48; 382/176, 181, 218; 345/168
See application file for complete search history.

(56) References Cited

U.S. PATENT DOCUMENTS

| | | | | |
|---|---|---|---|---|
| 5,014,327 A | * | 5/1991 | Potter .................. | G06K 9/6276 382/218 |
| 5,689,442 A | | 11/1997 | Swanson et al. | |
| 6,385,339 B1 | * | 5/2002 | Yokota ................. | G06K 9/6807 382/181 |
| 6,404,857 B1 | | 6/2002 | Blair et al. | |
| 6,718,023 B1 | | 4/2004 | Zolotov | |
| 6,757,361 B2 | | 6/2004 | Blair et al. | |
| 6,785,416 B1 | * | 8/2004 | Yu ...................... | G06K 9/00456 382/176 |
| 6,963,871 B1 | * | 11/2005 | Hermansen ....... | G06F 17/30634 |

(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.

(Continued)

*Primary Examiner* — Jeffrey A Burke
*Assistant Examiner* — Thong Vu
(74) *Attorney, Agent, or Firm* — Meunier Carlin & Curfman

(57) ABSTRACT

Methods and systems for keyword spotting, i.e., for identifying textual phrases of interest in input data. The input data may be communication packets exchanged in a communication network. A keyword spotting system holds a dictionary (or dictionaries) of textual phrases for searching input data. The input data and the patterns are assigned to multiple different pattern matching algorithms. For example, a share of the traffic is handled by one algorithm and smaller traffic shares may be handled by the others. The system monitors the algorithms performance as they process the data to search for a match. The ratio of traffic splitting among the algorithms is dynamically reassigned or adjusted to maximize the overall performance.

16 Claims, 3 Drawing Sheets

(56) References Cited

U.S. PATENT DOCUMENTS

| | | | |
|---|---|---|---|
| 7,216,162 B2 | 5/2007 | Amit et al. | |
| 7,453,439 B1* | 11/2008 | Kushler | G06F 3/0237 345/168 |
| 7,466,816 B2 | 12/2008 | Blair | |
| RE40,634 E | 2/2009 | Blair et al. | |
| 7,587,041 B2 | 9/2009 | Blair | |
| 7,877,401 B1* | 1/2011 | Hostetter | G06F 7/02 707/758 |
| 2002/0194159 A1* | 12/2002 | Kamath | G06F 17/30539 |
| 2003/0236783 A1* | 12/2003 | Eminovici | G06F 17/30985 |
| 2004/0249809 A1* | 12/2004 | Ramani | G06F 17/30259 |
| 2005/0108200 A1* | 5/2005 | Meik | G06F 17/3071 |
| 2006/0036561 A1* | 2/2006 | Aladahalli | G06F 17/509 706/48 |
| 2006/0277190 A1* | 12/2006 | Fox | G06F 17/30595 |
| 2007/0129976 A1* | 6/2007 | Hochberg | G06Q 10/06 705/7.12 |
| 2007/0226248 A1* | 9/2007 | Darr | G06Q 10/10 |
| 2008/0014873 A1 | 1/2008 | Krayer et al. | |
| 2008/0261192 A1 | 10/2008 | Huang et al. | |
| 2008/0285464 A1 | 11/2008 | Katzir | |
| 2008/0294656 A1* | 11/2008 | Bhat | G06F 17/30985 |
| 2008/0313214 A1* | 12/2008 | Duhig | G06F 17/30038 |
| 2009/0192874 A1* | 7/2009 | Powles | G06Q 30/02 705/14.58 |
| 2009/0220153 A1* | 9/2009 | Hall | G06K 9/209 382/181 |
| 2012/0011153 A1* | 1/2012 | Buchanan | G06F 21/552 707/771 |
| 2012/0203761 A1* | 8/2012 | Biran | G06K 9/00986 707/713 |
| 2012/0209828 A1* | 8/2012 | Takenaka | G06F 17/30563 707/710 |
| 2013/0282744 A1* | 10/2013 | Hartman | H04M 3/5183 707/758 |
| 2014/0195474 A1* | 7/2014 | Anguera Miro | G10L 15/12 706/48 |
| 2014/0250132 A1* | 9/2014 | Pollak | G06F 17/30058 707/748 |
| 2015/0046496 A1* | 2/2015 | Karmarkar | G09B 7/00 707/798 |
| 2015/0066963 A1* | 3/2015 | Macek | G06F 17/271 707/755 |

OTHER PUBLICATIONS

Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rohde & Schwarz GmbH & Co. KG, "Accessnet-T, DMX-500 R2, Digital Mobile eXchange," Product Brochure, Secure Communications, Mar. 2000, 4 pages.
Rohde & Schwarz GmbH & Co. KG, "Accessnet-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.
Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Usint TCAM," Proceedings of the 12th IEEE International Conference on Network Protocols (ICNP'04), 2004, 10 pages.

\* cited by examiner

SYSTEMS AND METHODS FOR KEYWORD SPOTTING USING ADAPTIVE MANAGEMENT OF MULTIPLE PATTERN MATCHING ALGORITHMS

FIELD OF THE DISCLOSURE

The present disclosure relates generally to data processing, and particularly to methods and systems for detecting strings in data.

BACKGROUND OF THE DISCLOSURE

Keyword searching techniques are used in a wide variety of applications. For example, in some applications, communication traffic is analyzed in an attempt to detect keywords that indicate traffic of interest. Some data security systems attempt to detect information that leaks from an organization network by detecting keywords in outgoing traffic. Intrusion detection systems sometimes identify illegitimate intrusion attempts by detecting keywords in traffic.

Various keyword searching techniques are known in the art. For example, Aho and Corasick describe an algorithm for locating occurrences of a finite number of keywords in a string of text, in "Efficient String Matching: An Aid to Bibliographic Search," Communications of the ACM, volume 18, no. 6, June, 1975, pages 333-340, which is incorporated herein by reference. This technique is commonly known as the Aho-Corasick algorithm. As another example, Yu et al. describe a multiple-pattern matching scheme, which uses Ternary Content-Addressable Memory (TCAM), in "Gigabit Rate Packet Pattern-Matching using TCAM," Proceedings of the 12$^{th}$ IEEE International Conference on Network Protocols (ICNP), Berlin, Germany, Oct. 5-8, 2004, pages 174-183, which is incorporated herein by reference.

Other string matching algorithms are described, for example, by Navarro and Raffinot, in "Flexible Pattern Matching in Strings—Practical On-Line Search Algorithms for Texts and Biological Sequences," Cambridge University Press, 2002, which is incorporated herein by reference. Chapter 3 of this book reviews multiple string matching algorithms such as the Wu-Manber (WM) and the Set Backward Oracle Matching (SBOM) algorithms.

SUMMARY OF THE DISCLOSURE

An embodiment that is described herein provides a method, including receiving input data to be searched for occurrences of a set of patterns, assigning the input data and the patterns to multiple different pattern matching algorithms, searching the input data using the pattern matching algorithms, evaluating a predefined metric, and reassigning the input data and the patterns to the pattern matching algorithms based on the evaluated metric.

In some embodiments, evaluating the predefined metric includes assessing a performance measure of the pattern matching algorithms. In other embodiments, evaluating the predefined metric includes assessing a characteristic of the input data. In yet other embodiments assigning the input data and the patterns includes applying each of the pattern matching algorithms to search a respective subset of the input data for the occurrences of all the patterns.

In some embodiments, reassigning the input data and the patterns includes reassigning a portion of the input data from a first pattern matching algorithm to a second pattern matching algorithm.

In other embodiments, assigning the input data and the patterns includes defining one of the pattern matching algorithms as a primary algorithm and assigning a majority of the input data to the primary algorithm, and reassigning the input data and the patterns includes redefining another of the pattern matching algorithms to serve as the primary algorithm and shifting the majority of the input data to the redefined primary algorithm.

In yet other embodiments, assigning the input data and the patterns includes applying each of the pattern matching algorithms to search all the input data for the occurrences of a respective subset of the patterns.

In an embodiment, evaluating the metric includes evaluating at least one metric type selected from a group of types consisting of: a volume of the input data processed by a given pattern matching algorithm per unit time; a memory size occupied by the assigned patterns; and the memory size used for maintaining state machines of respective flows of the input data.

There is also provided, in accordance with an embodiment that is described herein, an apparatus including an input circuit and a processor. The input circuit is configured to receive input data to be searched for occurrences of a set of patterns. The processor is configured to assign the input data and the patterns to multiple different pattern matching algorithms, to search the input data for the occurrences using the multiple algorithms, to evaluate a predefined metric, and to reassign the input data and the patterns to the pattern matching algorithms based on the evaluated metric.

The present disclosure will be more fully understood from the following detailed description of the embodiments thereof, taken together with the drawings in which:

DETAILED DESCRIPTION OF EMBODIMENTS

Overview

Figure 1:
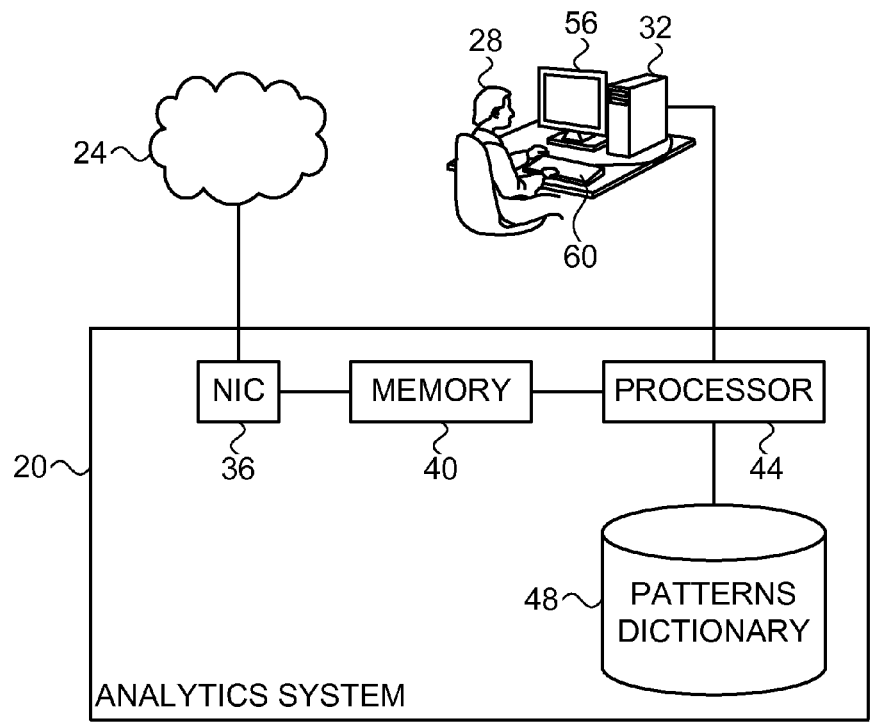
FIG. 1 is a block diagram that schematically illustrates a system for keyword searching, in accordance with an embodiment of the present disclosure.

Embodiments that are described herein provide improved methods and systems for keyword spotting, i.e., for identifying textual phrases of interest in input data. In the embodiments described herein, the input data comprises communication packets exchanged in a communication network. The disclosed keyword spotting techniques can be used, for example, in applications such as Data Leakage Prevention (DLP), Intrusion Detection Systems (IDS) or Intrusion Prevention Systems (IPS), and spam e-mail detection.

In the disclosed embodiments, a keyword spotting system holds a dictionary (or dictionaries) of textual phrases for searching input data. In a communication analytics system, for example, the dictionary defines textual phrases to be located in communication packets—such as e-mail addresses or Uniform Resource Locators (URLs).

In some applications, the dictionary comprises a large number of textual phrases, e.g., on the order of thousands or more, which may differ in size from one another. Each textual phrase in the dictionary typically comprises a string of characters, and in some embodiments may comprise various wildcard characters. Moreover, the dictionary may change over time, e.g., textual phrases may be added, deleted or modified. In the description that follows, the textual phrases are also referred to as keywords or patterns.

The performance of algorithms for keyword searching (also referred to as pattern matching algorithms) may be affected by many factors. Example factors include the dictionary size, the alphabet size (i.e., the number of different characters in the data), the sizes (or the minimal size) of the searched patterns, and the characteristics of the input data. In addition, an algorithm may suffer an attack (sometimes referred to as a "pattern matching algorithmic complexity attack" or "payload attack") that may considerably reduce its efficiency.

In embodiments of the present invention, the keyword spotting system assigns the input data and the patterns to multiple different pattern matching algorithms. In one embodiment, the system splits the input data traffic between two or more matching algorithms. In one embodiment a dominant share of the traffic is handled by one algorithm and smaller traffic shares by the others. The system monitors the algorithms performance (by evaluating a respective metric) as they process the data to search for a match. The ratio of traffic splitting among the algorithms is dynamically reassigned or adjusted to maximize the overall performance.

In another embodiment, two or more pattern matching algorithms, each assigned to a distinct dictionary, process the input data in parallel. In other words, the patterns are split among the matching algorithms. The input traffic is not split but is rather directed in full to each of the matching algorithms. The dictionaries together include all the patterns to be searched. Again, the algorithms performance is monitored and a respective metric is evaluated as they process the data. With response to data characteristics change over time, patterns may be dynamically reassigned among the different dictionaries to adjust the corresponding algorithms to maximal overall performance.

The disclosed techniques enable the system to exploit the advantages and avoid the disadvantages of each pattern matching algorithm. The presented embodiments enable to handle high-bandwidth traffic with time-varying characteristics, and to search for a large number of patterns that otherwise would not be feasible with limited computing resources. Moreover, the methods and systems described herein are insensitive to pattern matching algorithmic complexity attacks.

System Description

FIG. 1 is a block diagram that schematically illustrates a system 20 for keyword spotting, in accordance with an embodiment that is described herein. System 20 receives communication traffic from a communication network 24, and attempts to detect in the traffic predefined textual phrases, also referred herein to as keywords or patterns. When one or more keywords are detected, the system reports the detection to a user 28 using an operator terminal 32.

System 20 can be used, for example, in an application that detects data leakage from a communication network. In applications of this sort, the presence of one or more keywords in a data item indicates that this data item should not be allowed to exit the network. Alternatively, system 20 can be used in any other suitable application in which input data is searched for occurrences of keywords, such as in intrusion detection and prevention systems, detection of spam in electronic mail (e-mail) systems, or detection of inappropriate content using a dictionary of inappropriate words or phrases.

Although the embodiments described herein refer mainly to processing of communication traffic, the disclosed techniques can also be used in other domains. For example, system 20 can be used for locating data of interest on storage devices, such as in forensic disk scanning applications. Certain additional aspects of keyword spotting are addressed, for example, in U.S. patent application Ser. No. 12/792,796, entitled "Systems and methods for efficient keyword spotting in communication traffic," which is assigned to the assignee of the present patent applications and whose disclosure is incorporated herein by reference. Other applications may comprise, for example, pattern matching in gene sequences in biology.

Network 24 may comprise any suitable public or private, wireless or wire-line communication network, e.g., a Wide-Area network (WAN) such as the Internet, a Local-Area Network (LAN), a Metropolitan-Area Network (MAN), or a combination of network types. The communication traffic, to be used as input data by system 20, may be provided to the system using any suitable means. For example, the traffic may be forwarded to the system from a network element (e.g., router) in network 24, such as by port tapping or port mirroring. In alternative embodiments, system 20 may be placed in-line in the traffic path. These embodiments suitable, for example, for data leakage prevention applications, but can also be used in other applications.

Typically, network 24 comprises an Internet Protocol (IP) network, and the communication traffic comprises IP packets. The description that follows focuses on Transmission Control Protocol Internet Protocol (TCP/IP) networks and TCP packets. Alternatively, however, the methods and systems described herein can be used with other packet types, such as User Datagram Protocol (UDP) packets. Regardless of protocol, the packets searched by system 20 are referred to herein generally as input data.

In the example of FIG. 1, system 20 comprises a Network Interface Card (NIC) 36, which receives TCP packets from network 24. NIC 36 thus serves as an input circuit that receives the input data to be searched. NIC 36 stores the incoming TCP packets in a memory 40, typically comprising a Random Access Memory (RAM). A processor 44 searches the TCP packets stored in memory 40 and attempts to identify occurrences of predefined keywords in the packets.

The predefined keywords or patterns are stored in a patterns dictionary 48. Dictionary 48 may be stored on any suitable storage device. In some embodiments, dictionary 48, or part of it, may be stored in a cache memory (not shown) of processor 44 to increase the access speed by the processor. In some embodiments, dictionary may comprise multiple physical or logical distinct dictionaries.

When processor 44 detects a given keyword in a given packet, it reports the detection to user 28 using an output device of terminal 32, such as a display 56. For example, the processor may issue an alert to the user and/or present the data item (e.g., packet or session) in which the keyword was detected. In some embodiments, processor 44 may take various kinds of actions in response to detecting a keyword. For example, in a data leakage or intrusion prevention application, processor 44 may block some or all of the traffic upon detecting a keyword. User 28 may interact with system 20 using an input device of terminal 32, e.g., a keyboard 60.

The system configuration shown in FIG. 1 is an example configuration, which is chosen purely for the sake of conceptual clarity. Alternatively, any other suitable system configuration can be used. Generally, the different elements of system 20 may be implemented using software, hardware or a combination of hardware and software elements. In some embodiments, processor 44 comprises a general-purpose computer, which is programmed in software to carry out the functions described herein. The software may be downloaded to the computer in optical or electronic form, over a network, for example, or it may, additionally or alternatively, be provided and/or stored on non-transitory tangible media, such as magnetic, optical, or electronic memory.

Maximizing Performance by Adaptive Splitting of Traffic

Many algorithms for keyword searching are known in the art. The algorithms may differ in several attributes such as run-time, implementation complexity and average or worst-case behavior. Moreover, their performance may be affected by several factors such as the size of the dictionary and the alphabet, as well as the length of the keywords.

For example, the run time as a function of the input length may be linear in the worst case, such as in Aho-Corasick (AC, which also performs better with a small dictionary of short patterns, and its run-time is not sensitive to the pattern length), or sub-linear on average, such as in the Wu-Manber (WM) and the Set Backward Oracle Matching (SBOM) algorithms that have a sub-linear on average run-time, and support a large keywords set as well as a large alphabet. The AC, and the SBOM algorithms are additionally relatively simple to implement. Some algorithms such as the WM perform better when searching for a set of only long patterns, as short patterns degrade their performance significantly.

Since under different and changing conditions, different algorithms may perform more efficiently than others, the disclosed techniques incorporate more than just a single algorithm in a system for keyword searching. Thus, with limited computation resources, the system may dynamically divert the traffic to the most suitable algorithm so as to maximize the overall performance.

Figure 2:
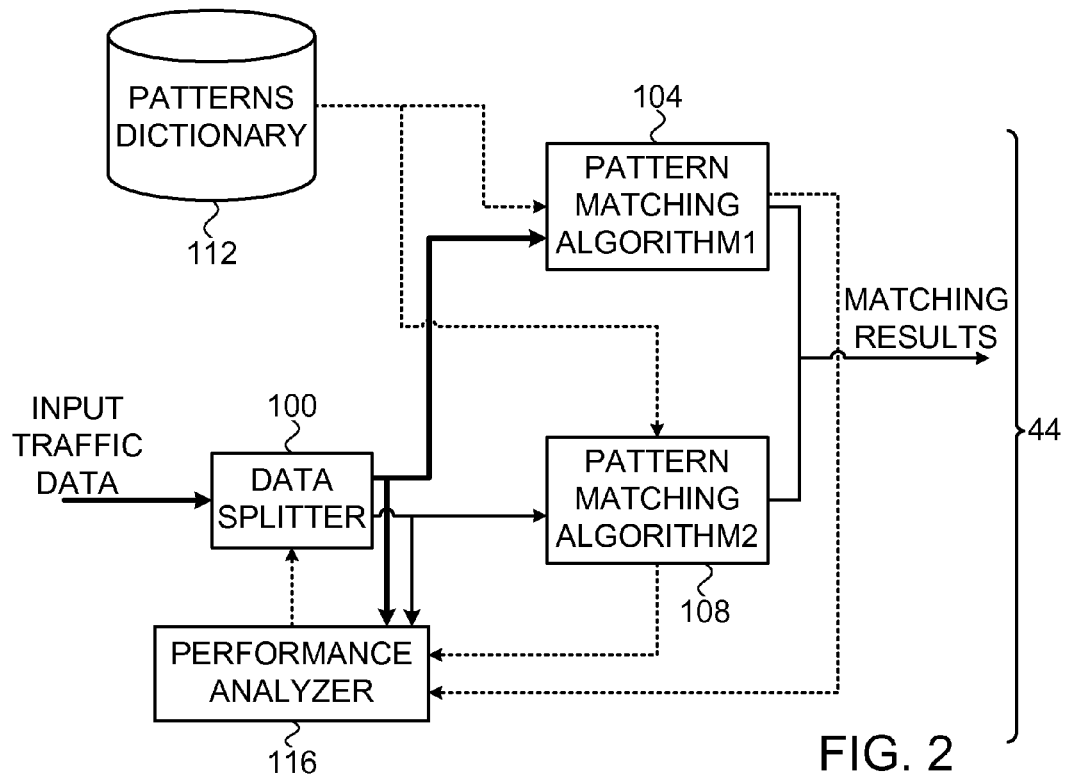
FIGS. 2 and 3 are block diagrams that schematically illustrate configurations of a processor in a system keyword searching, in accordance with embodiments of the present disclosure.

FIG. 2 is a block diagram that schematically illustrates an example configuration of processor 44, in accordance with an embodiment of the present disclosure. Input traffic data enters a data splitter 100. In the example embodiment of FIG. 2, the splitter has one input port and two output ports. Processor 44 configures the splitter to extract part or a share of the traffic to each output port. Typically, the input traffic comprises multiple flows of packets, and the splitter directs certain segments of the flows (or flows parts) to one port and other or partially common segments to the other port. The splitter configuration is also referred to herein as a splitting policy.

When dynamically changing the splitting policy the processor should avoid missing any patterns as a result of the policy change. Processor 44 may use any suitable method to guarantee smooth transition of traffic with no loss of patterns detection. For example, when changing splitting policy, the processor may direct to each algorithm a sufficient lag of past characters. As another example, the processor may split the traffic on a flow basis, i.e., aggregate and direct all the data of a flow to one algorithm. As yet another example, a respective data segment around the flow cut point may be handled by a third (not shown) algorithm.

Two different matching algorithms denoted ALGORITHM1 104 and ALGORITHM2 108 are assigned input data from the respective output ports of splitter 100. When system 20 starts to receive communication traffic, processor 44 configures the splitter to an initial splitting policy. The processor may select any suitable initial policy. For example, if the initial data characteristics are not available to system 20, the processor may configure to initially split the data evenly.

In some embodiments, one of the algorithms may be a-priori assumed to be the most efficient for the expected input data. For example, the URL of the data source (if available) may indicate the data characteristics. In such embodiments the processor may initially configure the splitter to direct a dominant share or even all the traffic to the most efficient algorithm (referred to as the primary algorithm). Additionally or alternatively, the processor may get an initial splitting policy from user 28 via terminal 32.

ALGORITHM1 and ALGORITHM2 are configured to search the data accepted from the splitter for occurrences of patterns stored in a pattern dictionary 112. When either algorithm locates a pattern in the data, processor 44 reports the matching event as described in FIG. 1 above.

The performance or efficiency of a matching algorithm may change over time. For example, modifying/adding/deleting patterns in the dictionary (e.g., by user 28) may reduce the processing complexity of one algorithm and increase the complexity of another algorithm at the same time. As another example, as the characteristics of the input data change over time, the complexity burden on two different algorithms may change in opposite directions.

A performance analyzer 116 monitors the performance, e.g., the efficiency, of each matching algorithm. The efficiency of a matching algorithm can be estimated, for example, by evaluating a respective metric, such as the amount of input data that the algorithm can process per unit time, e.g., the number of processed input bytes per second. Other example performance metrics include the dictionaries memory size, and the amount of memory needed for flow state machine, i.e., for storing the internal state of the algorithm for each flow that is being analyzed.

In some embodiments each algorithm estimates its own performance and sends it to analyzer 116 for monitoring. Alternatively, the analyzer calculates the performance metric internally. The analyzer may use any suitable method to decide at what points in time to monitor the performance. For example the analyzer may monitor the performance periodically. The time period may be on the order of a few seconds, or any other suitable time duration. Alternatively, the analyzer may continuously measure the algorithms performance. Further additionally or alternatively, the analyzer may monitor the performance in response to a change in the dictionary content by the user.

The analyzer uses the monitored performance to decide on updated splitting policy for splitter 100. For example, the analyzer may derive a proportional splitting policy, i.e., the more an algorithm is efficient with respect to the others, a higher share of the traffic is reassigned to that algorithm. As another example the analyzer may derive an absolute splitting policy. For example, the analyzer may compare the performance of each algorithm to a predefined threshold, and direct most of the traffic to the algorithm whose performance relative to the respective threshold is the highest.

As yet another example, the analyzer can indicate the splitter to provide an algorithm with another input data segment, such as a packet, as the algorithm concludes processing a previous input data segment. Alternatively, the processor may use any other suitable method to determine the splitting policy with response to the monitored performance. Typically, the analyzer diverts some of the traffic to each algorithm in order to keep monitoring the performance of all the algorithms. As yet another example, the analyzer may configure the splitter to direct a suitable data segment at the beginning of a certain flow to both algorithms. The rest of the flow will be directed to the algorithm that performed better on that data segment.

In addition to monitoring the algorithms performance, analyzer 116 analyzes the characteristics of the input traffic. The analyzer accepts the traffic output from the splitter for analysis. Since the data characteristics may change over time, and since each algorithm may be better tuned to some characteristics, the analyzer may change the splitting policy accordingly. The analyzer may use any suitable method to analyze the input data.

For example, the analyzer may calculate statistical attributes of the data characters. The analyzer can calculate a histogram that counts the number of each alphabet symbol in a data segment. In some embodiments, some metadata may accompany the data flow, indicating on the flow content, and therefore indicating on the data characteristics. For example a video, text, or images content may differ considerably in the data characteristics. In such embodiments, the analyzer may configure the splitter to direct a flow to the most suitable algorithm according to the accompanying metadata.

The analyzer may analyze the input data at any suitable points in time. For example the analyzer may periodically or continuously perform the analysis. Additionally or alternatively, the analyzer may perform the analysis when a new data source joins the traffic.

When deciding on an updated splitting policy as described above, analyzer 116 may additionally consider the inherent complexity of the algorithms. For example the processor may utilize optimization techniques to select a splitting policy that would maximize the overall efficiency (i.e., the total traffic the system can handle per a time unit), under overall constrained computation resources. As an example, the analyzer may trade computation time versus memory access time and optimize splitting the traffic among the algorithms accordingly.

Another example that may trigger the processor to change the splitting policy is referred to as an algorithmic complexity attack. A complexity attack is typically designed to push a specific algorithm to its worst case behavior, by planting in the traffic carefully selected data patterns. Therefore, the performance of a matching algorithm that suffers an attack reduces significantly. Since an attack is designed for a specific algorithm, other algorithms may be much less sensitive for that attack, and would typically maintain high performance.

When one algorithm is attacked, analyzer 116 would sense a significant performance reduction, and the processor may configure the splitter to stop directing any data to that algorithm. Alternatively, the processor maintains a small share of the traffic directed to the algorithm under attack and keeps monitoring the performance. When the attack stops, the processor may again split significant share of the traffic to that algorithm.

The embodiments in FIG. 2 use two matching algorithms and a splitter with two output ports, directing data to each algorithm. Other embodiments, however, may use any number of different matching algorithms and a corresponding suitable data splitter. For example an embodiment may use three different matching algorithms and a splitter with three output ports.

Figure 3:
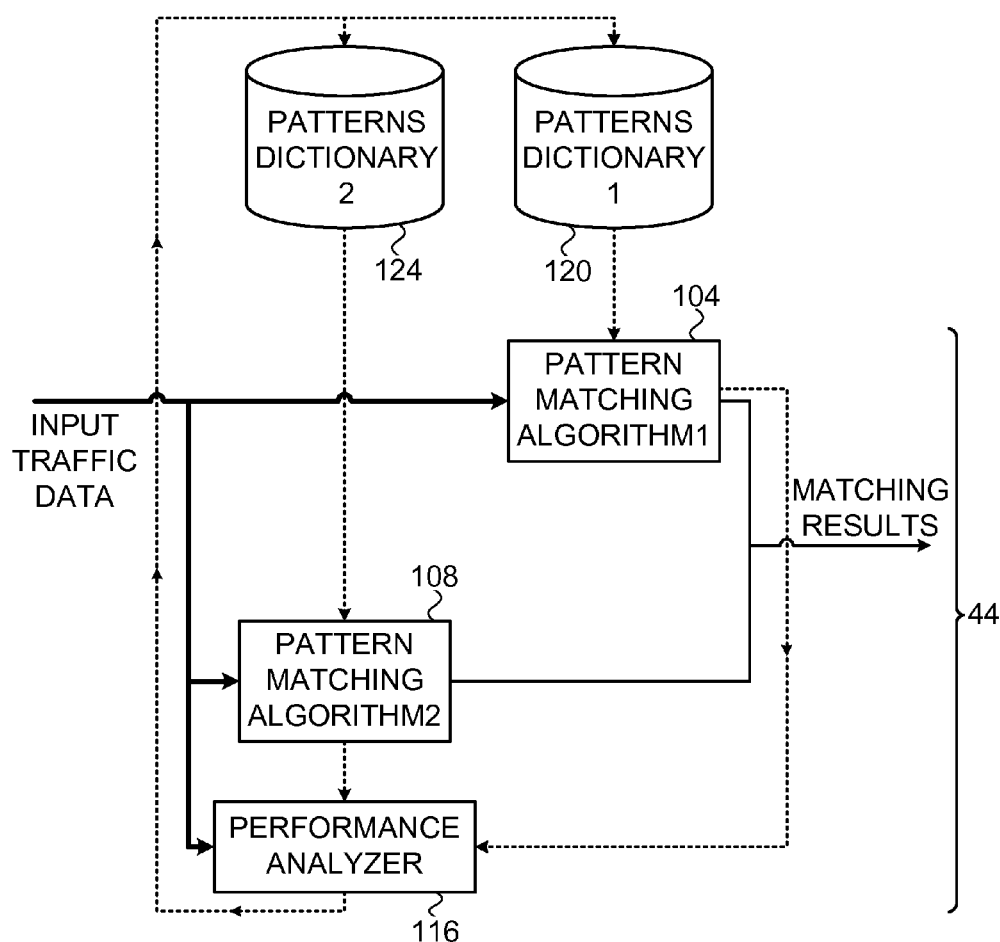

Maximizing Performance by Splitting Patterns Among Multiple Pattern Matching Algorithms FIG. 3 is a block diagram that schematically illustrates another example configuration of processor 44, in accordance with another embodiment of the present disclosure. Unlike the description of FIG. 2, both matching algorithms in FIG. 3, i.e., the full input traffic is assigned to both algorithms ALGORITHM1 104 and ALGORITHM2 108. Performance analyzer 116 monitors the algorithms performance and analyzes the input data characteristics similarly to the methods described in FIG. 2 above. In FIG. 3, ALGORITHM1 and ALGORITHM2 are configured to search for occurrences of patterns stored in respective dictionaries DICTIONARY1 120 and DICTIONARY2 124. Both dictionaries together hold all the patterns that system 20 is configured to search. Typically, although not necessarily, the sets of patterns in DICTIONARY1 and DICTIONARY2 are disjoint.

System 20 can use any suitable method to decide what patterns to initially put in each dictionary. For example, it may be a-priori assumed that each algorithm performs more efficiently given a specific set of patterns. As an example, system 20 may assign patterns to algorithms based on the patterns length. For example, in a system that uses the AC and the WM algorithms, the system may assign a relatively small dictionary (preferably residing in a cache memory) with short length patterns to the AC algorithm, and a dictionary of only long patterns to the WM algorithm.

Additionally, when using a large dictionary, the internal hash function in the WM algorithm may experience a larger false positive probability due to collisions.

In some embodiments, a certain matching algorithm may perform better than others when the patterns for search contain wildcard expressions, i.e., a pattern may not be fully defined. In such embodiments, a dictionary with wildcard patterns may be assigned to that superior algorithm.

Additionally or alternatively, user 28 may configure each dictionary with selected patterns via terminal 28. As described below, system 20 automatically adjusts the dictionaries content on the fly, to maximize the system performance for varying input traffic.

In yet other embodiments, one or more of the algorithms may suffer performance degradation when the dictionary changes on the fly. In such embodiments, new patterns inserted by the user, or patterns moved from another dictionary, may be assigned to a temporal dictionary and an algorithm (not shown). Under suitable conditions, patterns from the temporal dictionary may be merged into the algorithm's dictionary.

As described in FIG. 2 above, the characteristics of the data may change over time, and as a result affect the performance of the matching algorithms. Analyzer 116 monitors the algorithms performance and the characteristics of the input data similarly to the description in FIG. 2 above, by evaluating a respective metric. When the analyzer detects a change in the algorithms performance and/or in the input data characteristics, it may reassign patterns to the dictionaries to adjust and increase the overall performance. To reassign patterns the analyzer may move or swap patterns between the dictionaries. As another example, if one algorithm suffers an algorithmic complexity attack, analyzer 116 may move the dictionary patterns that are more susceptible to cause the attack when they are searched to the dictionary of the other algorithm.

The embodiments in FIG. 3 use two matching algorithms and two respective dictionaries. Other embodiments however may comprise any suitable number of matching algorithms and respective dictionaries.

Moreover, in some embodiments a system may be configured to use a smaller number of dictionaries than algorithms. In such embodiments, multiple algorithms may be configured to search for patterns that are stored in one dictionary. For example, in a system that comprises three algorithms and two dictionaries, the first two algorithms may be attached to one dictionary and the third algorithm to the other dictionary.

Figure 4:
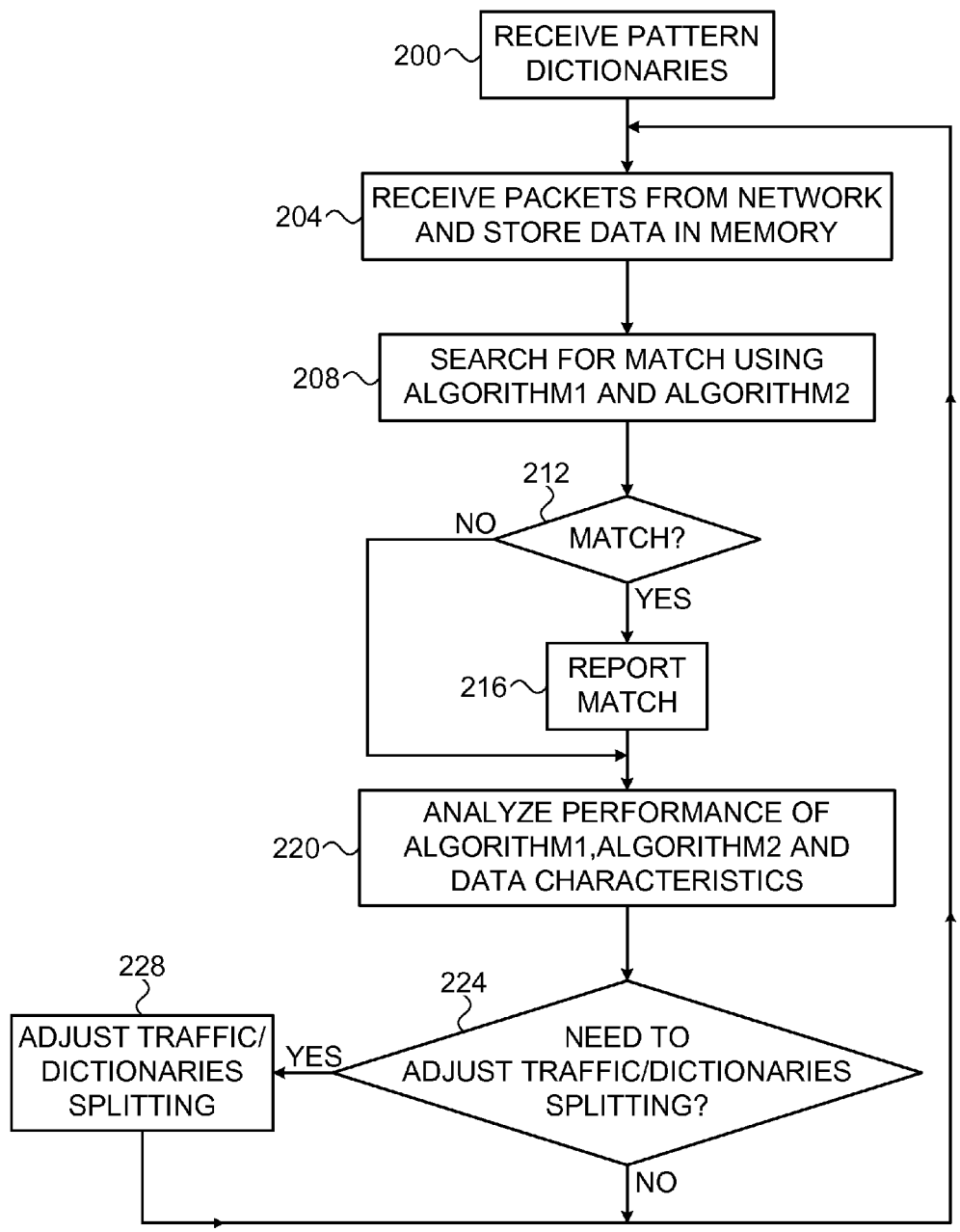
FIG. 4 is a flow chart that schematically illustrates a method for efficient keyword searching, in accordance with an embodiment of the present disclosure.

FIG. 4 is a flow chart that schematically illustrates a method for efficient keyword searching, in accordance with an embodiment of the present disclosure. The method begins with system 20 receiving patterns dictionaries at a patterns input step 200. System 20 receives packets (referred to as input data) from network 24 via NIC 36, and stores the packets in RAM 40, at a data input step 204.

Processor 44 searches the packets using algorithms 104 and 108 (using dictionary 112 or dictionaries 120 and 124) at a searching step 208. Processor 44 checks whether a match is found between a portion of the input data and any of the textual phrases (patterns) of the dictionaries, at a matching step 212. If a match with a respective pattern is found, processor 44 reports the match event to operator 28 using operator terminal 32, at an output step 216.

If no match is found, or following a match reporting, the method proceeds to an analyzing step 220. At step 220 the processor monitors and analyzes the performance of the matching algorithms ALGORITHM1 104 and ALGORITHM2 108. Still at step 220, the processor additionally analyzes the characteristics of the input data.

The processor checks if the traffic splitting policy should be changed, at a check analysis step 224. If the analysis of the algorithms performance and/or traffic characteristics indicates that by changing the splitting policy the overall performance will increase, the processor sets an updated splitting policy to data splitter 100 at adjusting step 228. Otherwise, the splitting policy is maintained and the processor loops back to step 204 above, in which system 20 receives subsequent input data.

Additionally or alternatively, at step 224 above, the processor checks if the analysis of the algorithms performance and/or data characteristics indicates that the overall performance may increase by moving or swapping patterns between DICTIONARY1 120 and DICTIONARY2 124. If the check result is positive, processor 44 adjusts the dictionaries content by moving or swapping patterns. After adjusting the dictionaries, or if there is no need for such adjustment the processor loops back to step 204.

It will be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method for identifying textual phrases of interest in input data, the method being performed by an apparatus comprising a network interface card (NIC) and a processor, the method comprising:

receiving, by the NIC, input communication traffic from a communication network, the input communication traffic comprising multiple flows of network packets exchanged in the communication network, the input communication traffic being received to be searched for occurrences of a set of patterns, wherein each pattern of the set of patterns comprises one or more textual phrases;

configuring, by the processor, a data splitter comprising at least one import port and at least a first and second output port, wherein the at least one input port is configured to receive the input communication traffic from the NIC, wherein the data splitter is configured by the processor to assign the input communication traffic and the patterns to multiple different pattern matching algorithms by at least directing certain segments of the multiple flows to the first output port and directing other segments of the multiple flows to the second output port in accordance with an initial splitting configuration policy, wherein the first output port is associated with a first pattern matching algorithm and wherein the second output port is associated with a second pattern matching algorithm, wherein the at least a first pattern of the set of patterns is assigned to first pattern matching algorithm and wherein at least a second pattern of the set of patterns is assigned to the second pattern matching algorithm;

executing, by the processor, the first and second pattern matching algorithms to identify occurrences of the textual phrases of the assigned patterns in the network packets, wherein the execution comprises the first pattern matching algorithm searching within the segments sent from the first output port for the one or more textual phrases of the first assigned pattern and the second pattern matching algorithm searching within the segments sent from the second output port for the one or more textual phases of the second assigned pattern;

monitoring, by the processor, performance of the first and second pattern matching algorithms by evaluating a predetermined metric for each of the first and second pattern matching algorithms;

generating, by the processor, an updated splitting policy configuration for the data splitter based on the monitored performance that reassigns which segments of the multiple flows of the input communication traffic are assigned to which output ports of the data splitter and which pattern of the set of patterns are assigned to which pattern matching algorithms; and configuring the data splitter in accordance with the updated splitting policy configuration.

2. The method according to claim 1, wherein evaluating the predefined metric comprises assessing a performance measure of the pattern matching algorithms.

3. The method according to claim 1, wherein evaluating the predefined metric comprises assessing a characteristic of the input communication traffic.

4. The method according to claim 1, wherein assigning the input communication traffic and the patterns comprises applying each of the pattern matching algorithms to search a respective subset of the input communication traffic for the occurrences of all the patterns.

5. The method according to claim 4, wherein reassigning the input communication traffic and the patterns comprises reassigning a portion of the input communication traffic from the first pattern matching algorithm to the second pattern matching algorithm.

6. The method according to claim 1, wherein assigning the input communication traffic and the patterns comprises defining one of the pattern matching algorithms as a primary algorithm and assigning a majority of the input communication traffic to the primary algorithm, and wherein reassigning the input data and the patterns comprises redefining another of the pattern matching algorithms to serve as the primary algorithm and shifting the majority of the input communication traffic to the redefined primary algorithm.

7. The method according to claim 1, wherein assigning the input communication traffic and the patterns comprises applying each of the pattern matching algorithms to search all the input communication traffic for the occurrences of a respective subset of the patterns.

8. The method according to claim 1, wherein evaluating the metric comprises evaluating at least
a memory size occupied by the assigned pattern.

9. An apparatus for identifying textual phrases of interest in input data, comprising:
a network interface card (NIC) configured to receive input communication traffic from a communication network, the input communication traffic comprising multiple flows of network packets exchanged in the communication network, the input communication traffic being received to be searched for occurrences of a set of patterns, wherein each pattern of the set of patterns comprises one or more textual phrases; and
a processor configured to:
configure a data splitter comprising at least one import port and at least a first and second output port, wherein the at least one import port is configured to receive the input communication traffic from the NIC, wherein the data splitter is configured by the processor to assign the input communication traffic and the patterns to multiple different pattern matching algorithm by at least directing certain segments of the multiple flows to the first output port and directing other segments of the multiple flows to the second output port in accordance with an initial splitting configuration policy, wherein the first output port is associated with a first pattern matching algorithm and wherein the second output port is associated with a second pattern matching algorithm, wherein the at least a first pattern of the set of patterns is assigned to first pattern matching algorithm and wherein at least a second pattern of the set of patterns is assigned to the second pattern matching algorithm;
execute the first and second pattern matching algorithms to identify occurrences of the textual phrases of the assigned patterns in the network packets, wherein the execution comprises the first pattern matching algorithm searching within the segments sent from the first output port for the one or more textual phrases of the first assigned pattern and the second pattern matching algorithm searching within the segments sent from the second output port for the one or more textual phases of the second assigned pattern;
monitor performance of the first and second pattern matching algorithms by evaluating a predetermined metric for each of the first and second pattern matching algorithms;
generate an updated splitting policy configuration for the data splitter based on the monitored performance that reassigns which segments of the multiple flows of the input communication traffic are assigned to which output ports of the data splitter and which pattern of the set of patterns are assigned to which pattern matching algorithm; and
configure the data splitter in accordance with the updated splitting policy configuration.

10. The apparatus according to claim 9, wherein the processor is configured to evaluate the predefined metric by assessing a performance measure of the pattern matching algorithms.

11. The apparatus according to claim 9, wherein the processor is configured to evaluate the predefined metric by assessing a characteristic of the input communication traffic.

12. The apparatus according to claim 9, wherein the processor is configured to assign the input communication traffic and the patterns by applying each of the pattern matching algorithms to search a respective subset of the input communication traffic for the occurrences of all the patterns.

13. The apparatus according to claim 12, wherein the processor is configured to reassign the input communication traffic and the patterns by reassigning a portion of the input communication traffic from the first pattern matching algorithm to the second pattern matching algorithm.

14. The apparatus according to claim 9, wherein the processor is configured to define one of the pattern matching algorithms as a primary algorithm and assigning a majority of the input communication traffic to the primary algorithm, and to reassign the input communication traffic and the patterns by redefining another of the pattern matching algorithms to serve as the primary algorithm and to shift the majority of the input communication traffic to the redefined primary algorithm.

15. The apparatus according to claim 9, wherein the processor is configured to assign the input communication traffic and the patterns by applying each of the pattern matching algorithms to search all the input communication traffic for the occurrences of a respective subset of the patterns.

16. The apparatus according to claim 9, wherein the processor is configured to evaluate the metric by evaluating at least
a memory size occupied by the assigned patterns.

* * * * *